United States Patent
Hong et al.

(10) Patent No.: US 9,369,933 B2
(45) Date of Patent: Jun. 14, 2016

(54) METHOD OF INITIATING A BASE STATION AND EQUIPMENT THEREOF

(71) Applicant: Samsung Electronics Co., Ltd., Gyeonggi-do (KR)

(72) Inventors: Wang Hong, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 227 days.

(21) Appl. No.: 14/356,126

(22) PCT Filed: Nov. 5, 2012

(86) PCT No.: PCT/KR2012/009235
§ 371 (c)(1),
(2) Date: May 2, 2014

(87) PCT Pub. No.: WO2013/066127
PCT Pub. Date: May 10, 2013

(65) Prior Publication Data
US 2015/0304857 A1    Oct. 22, 2015

(30) Foreign Application Priority Data

Nov. 4, 2011 (CN) .......................... 2011 1 0345392

(51) Int. Cl.
H04W 36/00 (2009.01)
H04W 36/16 (2009.01)
(Continued)

(52) U.S. Cl.
CPC .......... *H04W 36/0094* (2013.01); *H04W 16/18* (2013.01); *H04W 24/02* (2013.01);
(Continued)

(58) Field of Classification Search
None
See application file for complete search history.

(56) References Cited

U.S. PATENT DOCUMENTS 6,321,083 B1   11/2001   Vaara et al.
2005/0107085 A1   5/2005   Ozluturk
(Continued)

FOREIGN PATENT DOCUMENTS

EP        2046078 A1      4/2009
WO    WO 2005/050965 A1   6/2005

OTHER PUBLICATIONS

International Search Report dated Mar. 20, 2013 in connection with International Patent Application No. PCT/KR2012/009235, 3 pages.
(Continued)

*Primary Examiner* — Ashley Shivers (57) ABSTRACT

According to embodiments of the present invention, a method of initiating a base station is provided, comprising the following steps that: a basic coverage cell sends an switch on instruction to a hot spot cell in a closed state according to a predetermined rule, the switch on instruction carrying the predetermined rule information; the basic coverage cell is provided with a user equipment (UE) for measuring, and receives a measurement report from the UE; the basic coverage cell sends an switch on instruction to the hot spot cell such that the hot spot cell provides communication service for the UE. According to the embodiments of the present invention, a network-side equipment is further provided. As illustrated in technical solutions of the present invention, by setting a rule to select the hot spot cell adapted to be initiated, it can make data receiving of the UE suffer slight interference as initiating the base station, reduce interference form the data receiving of the UE to the down-link reference signal of the hot spot cell as possible, and thereby system performance can be improved effectively.

12 Claims, 5 Drawing Sheets

(51) Int. Cl.
*H04W 24/02* (2009.01)
*H04W 16/18* (2009.01)
*H04W 60/04* (2009.01)
*H04W 24/10* (2009.01)
*H04W 84/04* (2009.01)
*H04W 84/02* (2009.01)
*H04W 88/08* (2009.01)

(52) U.S. Cl.
CPC ...... *H04W36/0016* (2013.01); *H04W 36/0022* (2013.01); *H04W 36/16* (2013.01); *H04W 60/04* (2013.01); *H04W 24/10* (2013.01); *H04W 84/02* (2013.01); *H04W 84/045* (2013.01); *H04W 88/08* (2013.01)

(56) References Cited

U.S. PATENT DOCUMENTS

| | | | |
|---|---|---|---|
| 2009/0088159 | A1 | 4/2009 | Wu et al. |
| 2009/0280741 | A2 | 11/2009 | Krinsky |
| 2010/0097946 | A1 | 4/2010 | Celentano et al. |
| 2011/0312319 | A1* | 12/2011 | Lindoff ............... H04W 72/042 455/423 |
| 2012/0142328 | A1* | 6/2012 | Awoniyi ............... H04W 36/22 455/418 |
| 2014/0247742 | A1* | 9/2014 | Lee ................... H04W 52/0216 370/252 |

OTHER PUBLICATIONS

Written Opinion of International Searching Authority dated Mar. 20, 2013 in connection with International Patent Application No. PCT/KR2012/009235, 4 pages.

Extended European Search Report, dated Jun. 3, 2015, in connection with Application No. 12846076.3; 12 pages.

3GPP TSG-RAN WG3 #73bis; Fujitsu, "An efficient scheme for waking up the most appropriate cell(s)", Oct. 10-14, 2011; R3-112557; Zhuhai, China; 4 pages.

3GPP TR 136.927 version 10.1.0 Release 10; ETSI Technical Report, "LTE; Evolved Universal Terrestrial Radio Access (E-UTRA); Potential solutions for energy saving for E-UTRAN"; Oct. 2011; Sophia Antipolis Cedex, France; 24 pages.

3GPP TSG RAN WG3 Meeting #72; Huawei, "Energy Saving solution enhancement", May 9-13, 2011; R3-111148; Barcelona, Spain; 8 pages.

3GPP TSG RAN WG3#70; CATT, "UE-assisted Selective Activation of the Hotspots", Nov. 15-19, 2010; R3-103234; Jacksonville, US; 3 pages.

* cited by examiner

METHOD OF INITIATING A BASE STATION AND EQUIPMENT THEREOF

CROSS-REFERENCE TO RELATED APPLICATION(S)

The present application claims priority under 35 U.S.C. §365 to International Patent Application No. PCT/KR2012/009235 filed Nov. 5, 2012, entitled "METHOD OF INITIATING A BASE STATION AND EQUIPMENT THEREOF". International Patent Application No. PCT/KR2012/009235 claims priority under 35 U.S.C. §365 and/or 35 U.S.C. §119 (a) to Chinese Patent Application No. 201110345392.1 filed Nov. 4, 2011 and which are incorporated herein by reference into the present disclosure as if fully set forth herein.

TECHNICAL FIELD

The present invention relates to a mobile communication field, and more particularly, to a method of initiating a base station and an equipment thereof.

BACKGROUND ART

Figure 1:
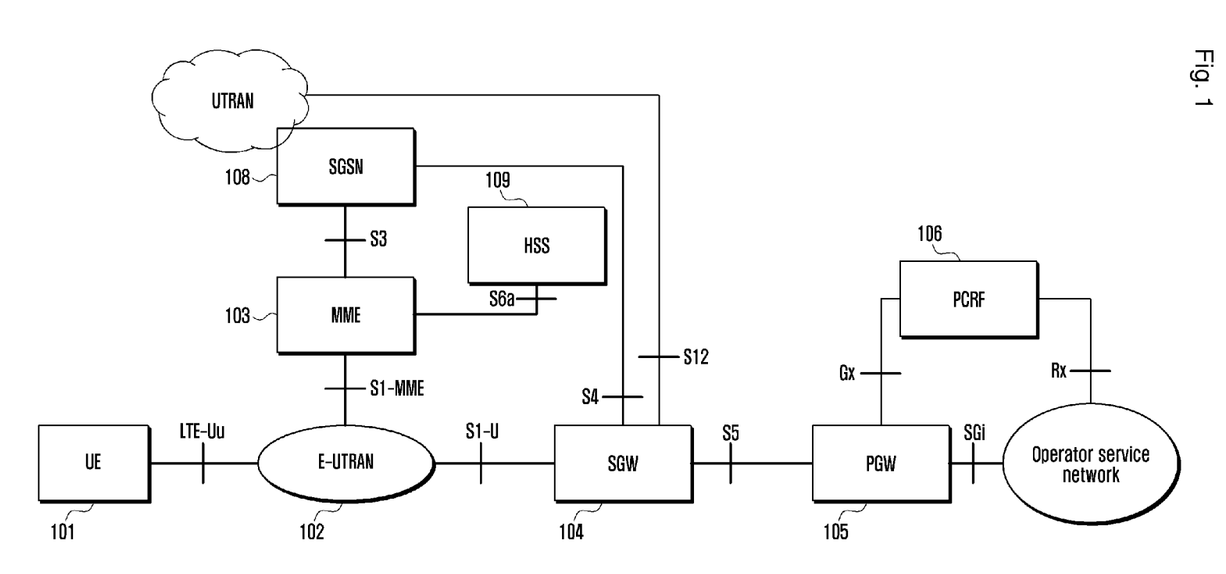
FIG. 1 is a system architecture view of a system architecture evolution (SAE)

The modern mobile communication increasingly directs to provide multimedia service with high rate transmission to users, as shown in FIG. 1, a system architecture view of a system architecture evolution (SAE) is provided, wherein:

An user equipment (UE) 101 is a terminal unit for receiving data. An evolution universal terrestrial radio access network (E-UTRAN) 102 is a radio access network, including a macro base station (eNodeB/NodeB) that provides a wireless network interface for the UE. A mobile management entity (MME) 103 is responsible for managing movement context, conversation context and security information of the UE. A service gateway (SGW) 104 mainly provides a function as a user plane. MME 103 and SGW 104 are possibly located in the same physical entity. A packet data network gateway (PGW) 105 is responsible for a function, such as charging and lawful interception, and also can be located in the same physical entity with the SGW 104. A policy and charging rules function entity (PCRF) 106 provides a policy for quality of service (QoS) and charging standards. A universal packet radio service support node (SGSN) 108 is a network node equipment providing a route for data transmission in a universal mobile telecommunication system (UMTS). A home subscriber server (HSS) 109 is a home subsystem of the UE in charge of protecting user's information such as current position of the user equipment, address of the service node, user's security information and packet date context of the user equipment.

At present, sustainable development is a long-term target, so that people try to reduce resource waste and environmental damage as much as possible. For this, improving energy utilization efficiency and reducing energy consumption become more and more important. In a communication field, effort can be provided to study how to reduce the energy consumption and maintenance cost of the network equipment. The mobile operator endeavors in reducing the energy consumption and maintenance cost of the equipment as much as possible without interference to the present network. Wherein, how to improve the energy efficiency of the equipment and terminal is becoming a key point of reducing cost.

Figure 2:
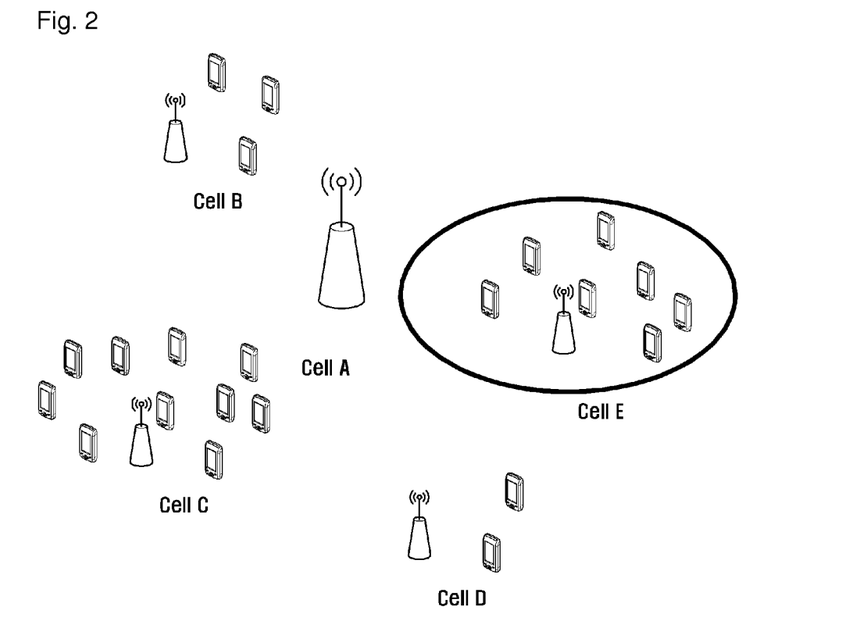
FIG. 2 is a schematic view of deployment of a base station that repeatedly covers multiple cellulars.

In the same region as shown in FIG. 2, multiple cellulars are repeatedly covered, and a cell B, cell C, cell D and cell E of LTE are completely covered by the cell A which may be a UMTS or GSM cell or a LTE cellular. The cell A provides a basic wireless coverage for this region, and is a cell as initially constructed. As the user capacity is increasing, the users in some districts are much centralized, and thereby the user capacity is considerably large, wherein the user capacity is associated with number of users and quality of service (Qos) required by the users. The more number of the users is, the higher request for Qos becomes, so that the cell is required to provide larger user capacity. The cell where the users are centralized is regarded as a user hot spot district, in this district, new cell equipments are disposed to provide service to the users in the hot spot district, for example, the cell B, cell C, cell D and cell E are within the hot spot district, the main object of these cellulars is to increase the user capacity and provide more advanced interface technology. The cell A seamlessly covers this region and provides service to this region. Coverage of the hot spot is non-continuous. For convenience of differentiation, the cell A is called as a basic coverage cellular, the cell B, C, D and E as the hot spot cellular.

The user capacity in the hot spot district is various along with the time, for instance, in a large shopping mall, there are many users in daytime, fewer users in night. The user capacity in some hot spot districts is various due to events, for instance, in a stadium, there are many users when an athletic contest is held, fewer users in the rest time. If the cell base station within the hot spot district can work as usual when there is not any user capacity, a large amount of electric energy will be wasted, obviously it is contrary to the target of sustainable development. Accordingly, the cell equipments in the hot spot district may be closed if there is no user capacity, and thereby do not provide interface service; or may be switch oned if there is user capacity, and thereby start to provide interface service for the users via an air interface, so that the purpose of reducing energy consumption can be achieved.

On the cell equipments in the hot spot district, the operator sets some closing policies in advance. When satisfying condition for closing, the equipments of the hot spot cell will be automatically closed, and send message to the adjacent cellulars, informing that the hot spot cell is in a closed state.

After the cell equipments in the hot spot district are closed, the cell for providing basic coverage serves to the users in the present region. When the number of users within the hot spot district is increased, and the user capacity in the cell for providing the basic coverage is above a threshold, it is required to switch on the cell equipments in the hot spot district.

Figure 3:
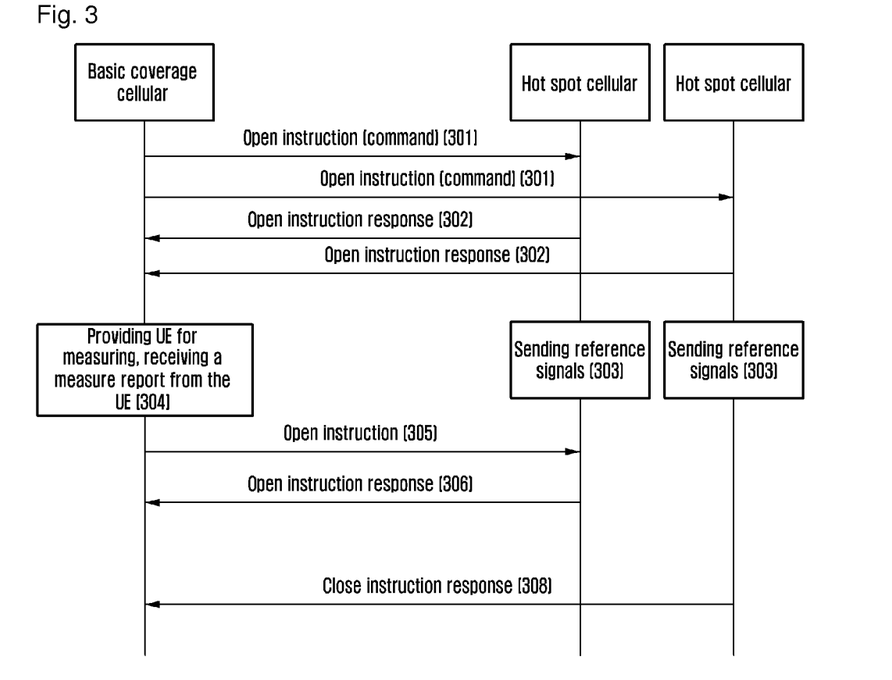
FIG. 3 is a process diagram of initiating a base station in prior art.

A method of switch on the base station is provided with a cell for providing basic coverage, which sends a instruction to the cell equipments in the hot spot district when the user capacity of this cell is above a certain threshold to allow the cell equipments in the hot spot district to access a stage of preparation, at this stage, the hot spot cell merely sends basic control information, such as reference information and synchronizing information, rather than provide service for the UE, so that the UE can not be selected for this cellular. In FIG. 3, the method is described as follows:

In 301 step: a basic coverage cell decides to switch onswitch on the hot spot cellular, sends an switch on request message to the hot spot cellular, including an instruction for directing the hot spot cell to access a preparation state.

If user capacity of the basic coverage cell increases to exceed a predetermined threshold, the hot spot coverage cell is required to share some user capacity together with the basic coverage cellular. However, not all of the hot spot cell can shall the user capacity. This is associated with position of users and position of the hot spot cellular, if there are a large amount of users near the hot spot cellular, by switch onswitch oning the hot spot cellular, the users can be switched into the hot spot cell such that the user capacity of the basic coverage cell will be decreased, by contrast, if there is no or fewer users near the hot spot cellular, by switch onswitch oning the hot spot cellular, the users will not be served by the hot spot cell such that the user capacity of the basic coverage cell can not be shared by the hot spot cellular. Therefore, the basic coverage cell needs to find out the hot spot cell enable to share the user capacity efficiently, so that the basic coverage cell will not allow the hot spot cell to access a work state, but access a preparation state.

In 302 step: the hot sport cell sends an switch onswitch on response message to the basic coverage cell to confirm receipt of the message of 301 step.

In 303 step: the hot spot cell starts to access the preparation state and sends down-link reference information.

In 304 step: the basic coverage cell is provided with the UE for measuring, and receives a measurement report from the UE. The basic coverage sends a measurement configuration message to a plurality or all of the UEs in a connecting manner, instructing the UE to measure the surrounding cellulars. The UE sends a measurement report to the basic coverage cellular, wherein the measurement report includes measurement results of the surrounding cellulars, such as the physical cell identification (PCI) measured by the UE, reference signal receiving power (RSRP), and reference signal receiving quality (RSRQ). The basic coverage cell analyses the measurement report send by the UE and then determines the number of the UE covered by the hot spot cellular. Each hot spot cell has only one PCI, depending on which the basic coverage cell can find out the corresponding hot spot cellular. If the RSRP or RSRQ of the hot spot cell corresponding to the PCI measured by the UE is above a certain threshold, it can be determined that the UE is covered by the hot spot cellular. If the UE covered by the hot spot cell is above the predetermined threshold, the basic coverage cell may determine that the hot spot cell should be switch on. If the UE covered by the hot spot cell is below the predetermined threshold, the basic coverage cell may determine that the hot spot cell should not be switch on In accordance with the determination results mentioned above, the basic coverage cell sends an switch on message of the 305 step to the hot spot cell that should be switch oned, hereafter, the hot spot cell accesses the normal work state and thereby can serve to the UE. The hot spot cell can send a response message of the 306 step to the basic coverage cellular.

The basic coverage cell sends the switch off instruction of the 307 step to the hot spot cell that should be switch off. The hot spot cell may send the response message of the 308 step to the basic coverage cellular. Thereafter, the hot spot cell accesses the switch off state.

However, the above-mentioned technical solutions have disadvantages below:

When the cell equipments of the hot spot district access the preparation stage, control signaling power as transmitted is higher. If the UE is close to a transmit unit of the hot spot cell but far from the basic coverage cellular, the UE will be interfered intensively by the hot spot cellular, and furthermore it causes the UE can not receive the data and be failed in a radio link. The more the users are, the more the failure in the radio link is.

If the UE is closer to the transmit unit of the basic coverage cellular, the down-link signal received by the UE from the basic coverage cell is stronger. If the hot spot cell uses the same resources, signals transmitted by the hot spot cell will be interfered by the down-link signals transmitted by the basic coverage cell such that the UE can not detect the reference information transmitted by the hot spot cellular.

Therefore, it is necessary to provide an effective technical solution to solve the problems of degradation of the system performance and poor service quality presented when the hot spot cell is initiated.

DISCLOSURE OF INVENTION

Technical Problem

The present invention has been made to address at least the above problems and/or disadvantages and to provide at least the advantages described below. Accordingly, an aspect of the present invention provides a method and apparatus to provide an effective technical solution to solve the problems of degradation of the system performance and poor service quality presented when the hot spot cell is initiated.

Solution to Problem

The present invention directs to at least solve one of the technical disadvantages mentioned above, particularly by setting a rule to select the hot spot cellulars applicable for switch on, the present invention can make data receiving of the UE suffer from a slight interference as initiating a base station, reduce the interference to the data of the UE from the down-link reference signals of the hot spot cellular, reduce probability that the UE occurs f radio link failure, and facilitate improving the probability that the UE detects the hot spot cellular.

To achieve the object of the present invention, a method of switch on a base station is provided according to the embodiments of the present invention, comprising the following steps:

The basic coverage cell sends an switch on instruction to the hot spot cell in a closed state according a predetermined rule, or the basic coverage cell sends an switch on instruction carrying a predetermined rule to the hot spot cell in a closed state;

The basic coverage cell configure user equipment (UE) for measuring, and receives a measurement report from the UE;

The basic coverage cell sends a second switch on instruction to the hot spot cell such that the hot spot cell can provide communication service to the UE.

According to one embodiment of the present invention, a method of switch on a base station is provided, comprising:

the basic coverage cell informs the hot spot cell to go into an switch on preparation state, telling physical layer identity used in the hot spot cell in an preparation state;

the hot spot cell sends a down-link reference signal through an air interface.

According to one embodiment of the present invention, further comprising the steps as follows:

the basic coverage cell configure the UE for measuring; and determining whether the hot spot cell should be switch on according to the measurement results; and the basic coverage cell informs the hot spot cell to be switch on and then the hot spot cell entering the normal work state.

The basic coverage cell and the hot spot cell may support different radio access technology or support the same radio access technology. Generally, they have at least one same frequency. An switch on preparation state of the hot spot cell means that the hot spot cell merely sends basic control signals rather than allocating resources for the UEs, and the UE can not be camped on or be switched into the hot spot cell in the preparation state. The hot spot cell uses the physical layer identity configured for the basic coverage cellular. The control signals sent by the hot spot cell at least include physical layer reference signals. The position where the reference signals are sent is corresponding to the physical layer identity, and such a corresponding relation has been defined in the prior art.

The basic coverage cell can directly configure the resources of the down-link reference signals used in the hot spot cellular. The hot spot cell can determine whether its physical layer identity is corresponding to the down-link reference signals configured by the basic coverage cell. If the physical layer identity is not corresponding to the allocated resource, the hot spot cell may select one from a list of the physical layer identity supported thereby in correspondence with the resource, or send a message to inform the basic coverage cell that the hot spot cell can not support the down-link reference signals as configured.

According to one embodiment of the present invention, a method of initiating a base station is provided, comprising:

the basic coverage cell informs the hot spot cell to go into an switch on preparation state, setting a transmission power of the hot spot cellular;

the hot spot cell sends the down-link reference signals through the air interface.

According to one embodiment of the present application, further comprising the steps:

the basic coverage cell configure the UE for measuring, and determines whether the hot spot cell should be switch on according to the measured results; and the basic coverage cell informs the hot spot cell to switch on and entering the normal work state.

The basic coverage cell and the hot spot cell can support different radio access technology or support the same radio access technology. Generally, they have at least one same frequency. The switch on preparation state of the hot spot cell means that the hot spot cell merely sends basic control signals rather than allocating resources for the UE, and the UE can not be camped on or be switched into the hot spot cell in the preparation state. The hot spot cell uses the physical layer identification configured for the basic coverage cellular. The control signals transmitted by the hot spot cell at least include physical layer reference signals. The position where the reference signals are transmitted is related to the physical layer identity, and such corresponding relation has been defined in the prior art.

The basic coverage cell previously gets the positions of the hot spot cell, and sets different transmission powers according to positions of the hot spot cell.

According to one embodiment of the present invention, a network-side equipment is provided, comprising a counting module, receiving module and sending module.

The counting module for counting user capacity in a service area;

The receiving module for providing a UE for measuring, and receiving the measurement results of the UE; and The sending module for sending a switch on instruction to the hot sport cell in a switch off state according to a predetermined rule, and switch on instruction carrying a predetermined rule information; and sending an switch on instruction to the hot spot cell such that the hot spot cell provides communication service for the UE.

As illustrated in the above-mentioned technical solutions, the present invention can reduce the interference to the UE' data receiving when switch on the base station, and reduce interference from the data receiving of the UE to the down-link reference signals of the hot spot cell as possible, by setting rules to select the hot spot cell applicable for switch on; and can effectively reduce probability that the UE occurs the radio link failure, and furthermore facilitate improving probability that the UE detects the hot spot cell, by selecting the hot spot cell applicable for switch on. The above-mentioned technical solutions of the present invention make a slight alternation to the present system, and thereby can not affect compatibility of the system but for achievement of simplicity and high efficiency.

Additional aspects and advantages of the present invention will be set forth in part in the description which follows, and will be apparent upon illustrations of the following or may be learn from the practice of the invention.

Advantageous Effects of Invention

Advantages, and salient features of the invention will become apparent to those skilled in the art from the following detailed description, which, taken in conjunction with the annexed drawings, discloses exemplary embodiments of the invention.

BRIEF DESCRIPTION OF DRAWINGS

The above-mentioned and/or additional aspects and advantageous of the present invention will be obvious and easily understood with reference to disclosures as illustrated in the embodiments combining with the appended drawings, in which.

MODE FOR THE INVENTION

Reference will now be made in detail to the specific embodiments of the present invention, examples of which are illustrated in the accompanying drawings. Wherever possible, the same reference numbers will be used throughout the drawings to refer to the same or similar parts or the parts with the same or similar performance. The following exemplary embodiments are illustrated with reference to the drawings just for explaining the present invention but not being construed as limiting the present invention.

In present communication system, a base station generally covers a plurality of cell. For instance, in a cell communication network, the base station may be set at a center of a cell to form a circular coverage area by using omnidirectional antenna, or the base stations may be respectively set at three vertexes of a hexagon of each of the cell, three 120° sectorial radial directional antennas are used in each base station to respectively cover ⅓ region of each of three adjacent cell, i.e. each cell is covered by the three 120° sectorial radial antennas together. According to the technical solution of the present invention, a basic coverage cell and a hot spot cell are covered by different base stations, an interaction between the basic coverage cell and the hot spot cell is an interaction between the base station which covers the basic coverage cell and the base station which covers the hot spot cell. If a X2 interface exist between the basic coverage cell and the hot spot cell, after a logical connection of the X2 interface will be established between the base station which covers the basic coverage cell and the base station which covers the hot spot cellular, a signaling interaction between the basic coverage cell and the hot spot cell can be in carried through the established logical connection. Without the X2 interface connection, a logical connection of a S1 interface is established between the base station which covers the basic coverage cell and MME, another logical connection of the S1 interface will be established between the base station which covers the hot spot cell and the MME either, and then the signaling interaction between the basic coverage cell and the hot spot cell can be in carried through the two logical connection of S1 and transmitted by the MME.

In order to achieve the object of the present invention, according to one embodiment of the present invention, a method of switch on a base station is provided, comprising the following steps:

When user capacity within a service area is above a predetermined threshold, the basic coverage cell sends an switch on instruction to the hot spot cell in a switch off state according to a predetermined rule, or the basic coverage cell sends an switch on instruction carrying the predetermined rule to the hot spot cell in a switch off state;

The basic coverage cell configures the user equipment (UE) for measuring, and receives a measurement report from the UE;

When the users within the hot spot cell fulfilling the predetermined rule reach to the predetermined number, the basic coverage cell sends an switch on instruction to the hot spot cell such that the hot spot cell can provide communication service for the UE.

Figure 4:
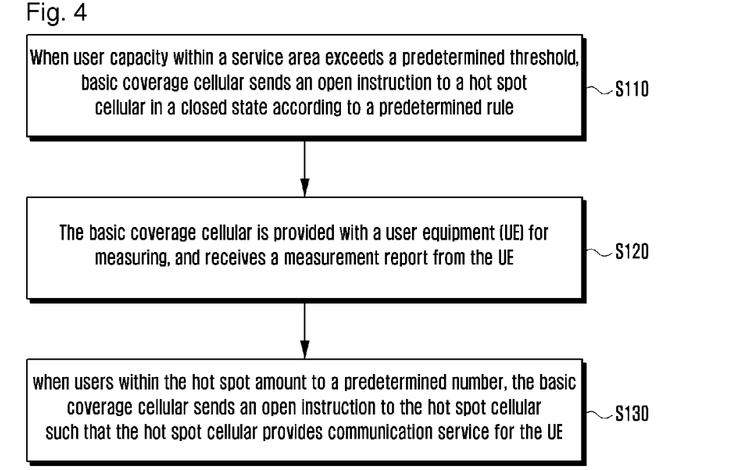
FIG. 4 is a flow diagram of a method of initiating a base station according to an embodiment of the present invention.

As shown in FIG. 4, a flow diagram of a method of initiating a base station is provided, comprising the following steps:

In S110: when the user capacity within a service area is above a predetermined threshold, the basic coverage cell sends an switch on instruction to the hot spot cell in a switch off mode according to a predetermined rule, or the basis coverage cell sends an switch on instruction carrying a predetermined rule to the hot spot cell in a switch off mode.

When the user capacity in the basic coverage cell is above the threshold, the basic coverage cell will select some suitable hot spot cells for switching on to share some users. As illustrated in the embodiment of the present invention, the basic coverage cell may select to send an switch on instruction to the applicable hot spot cell in the switch off mode according to the rule; or the basic coverage cell directly sends an switch on instruction to the hot spot cell in the switch off mode, wherein the switch on instruction carries a rule for selecting the hot spot cell. Selection for the hot spot cell can be achieved by the above-mentioned way.

As illustrated in the embodiment of the present invention, the basic coverage cell sends an switch on instruction to the hot spot cell in the switch off mode according to the predetermined rule, or the switch on instruction carries the predetermined rule. Specifically, the predetermined rule includes but limit to following one or more rules:

the hot spot cell having the same type physical layer identity;

setting a time frequency resource of a down-link reference signal in the hot spot cell as a predetermined value;

setting a physical layer identification of the hot spot cell as a predetermined value;

setting a transmission power or a maximum transmission power of the hot spot cell as a predetermined value.

In particular, the hot spot cells which having the same physical layer identity type send the down-link reference signal in the same time frequency resource. If the physical layer identities are divided into several types. The down-link reference signal corresponding to the same type physical layer identity is transmitted in the same time frequency resource. The down-link reference signal corresponding to the different physical layer identity type is transmitted in the different time frequency resource.

After receiving an switch on instruction, the hot spot cell in the switch off mode goes into an switch on preparation state, and sends the down-link reference signal through an air interface according to the predetermined rule; or After receiving an switch on instruction, the hot spot cell in switch off ing mode complying with the predetermined rule enters the switch on preparation state, and sends the down-link reference signals through the air interface.

The physical layer identity used in the hot spot cell as configured by the basic coverage cell actually instructs the time frequency resource used by the reference signals. If the physical layer identities used in all of hot spot cells that intend to be the preparation state are belong to the same type, the down-link reference signals in these hot spot cellulars are transmitted in the same time frequency resources, so that the basic coverage cell may send the user data by not using these time frequency resources as possible. By virtue of the above suitable selection, the present invention can avoid conflict from the time frequency as much as possible, can make data receiving of the UE suffer from a slight interference, reduce interference from data received by the UE to the down-link reference signals of the hot spot cell as possible, also can effectively reduce probability that the UE occurs failure in the radio link, and facilitate improving the probability that the UE detects the hot spot cell.

In the case that the hot spot cell is configured with a predetermined rule that a transmission power or a maximum transmission power is equal to a predetermined value, the hot spot cell sends the down-link reference signal in such a manner that the transmission power is a predetermined value or the maximum transmission power is below or equal to the predetermined value.

For example, the transmission power or a maximum transmission power can be determined depending on position information between the basic coverage cell and the hot spot cellular. Generally, the basic coverage cell can acquire the basic information of the hot spot cellular, such as the physical layer identity of the hot spot cell, cell identity, and position of the hot spot cell etc. These information can be obtained during establishing relation among the adjacent cells currently defined or by previous configuration. For instance, if the basic coverage cell and the hot spot cell have a X2 interface, these information can be obtained by X2 setup procedure or the interaction on the X2 interface afterwards; and without X2 interface, these information can be obtained by means of a S1 interface.

Different maximum transmission powers are configured to the hot spot cell by the basic coverage cellular. The hot spot cell located far from the transmit unit of the basic coverage cell may be configured with a smaller transmission power. The hot spot cell located close to the transmit unit of the basic coverage cell may be configured with a larger transmission power. By setting power of the hot spot cell rationally, the present invention can avoid conflict from the time frequency as much as possible, make data receiving of the UE suffer from a slight interference, reduce the interference from the data received by the UE to the down-link reference signals of the hot spot cell as possible, also can effectively reduce probability that the UE occurs failure in the radio link, and facilitate improving the probability that the UE detects the hot spot cellular.

In S120: the basic coverage cell configures a UE for measuring, and receives a measurement report from the UE.

The basic coverage cell sends measurement configuration message to the UE, the measurement configuration message may use a presently defined message. The basic coverage cell may send the measurement configuration to all or part of the UEs in a connecting mode. Subsequently, the UE sends the measurement report message to the basic coverage cellular. The measurement report message can use a presently defined message, including the measured physical layer identity of the cell, and the measurement results such as RSRP, RSRQ of the reference signal of the cell.

In S130: when users number within the hot spot cell amount to the predetermined number, the basic coverage cell will send a switch on instruction to the hot spot cell such that the hot spot cell can provide communication service for the UE.

The measurement report transmitted by the UE includes measurement results of neighboring cells. For example, the measurement report contains the physical layer cell identity (PCI) measured by the UE, the reference signal receiving power (RSRP), and reference signal receiving quality (RSRQ) of the cell. The basic coverage cell analyses the received measurement report transmitted by the UE to determine the UE number covered by the hot spot cell. Obviously, the hot spot cell mentioned herein is the hot spot cell complying with the above rule. Each hot spot cell has only one PCI, the basic coverage cell can find out the corresponding hot spot cell according to PCI. If the RSRP or RSRQ of the hot spot cell corresponds to the PCI measured by the UE is above the threshold, it can be determined that UE is serviced by the hot spot cell. If the UE served by the hot spot cell is above a predetermined threshold, the basic coverage cell can determine that the hot spot cell should be switch on to provide service for the UEs. If the UE number serviced by the hot spot cell is below the predetermined threshold, the basic coverage cell can determine that the hot spot cell should not be switch on.

When users number within the hot spot cell in a switch on preparation state do not reach to the predetermined user number, the basic coverage cell will send a switch off instruction to the hot spot cell such that the hot spot cell returns to the switch off state.

Concrete application scenes are incorporated into the following for further explanation of the present invention.

Figure 5:
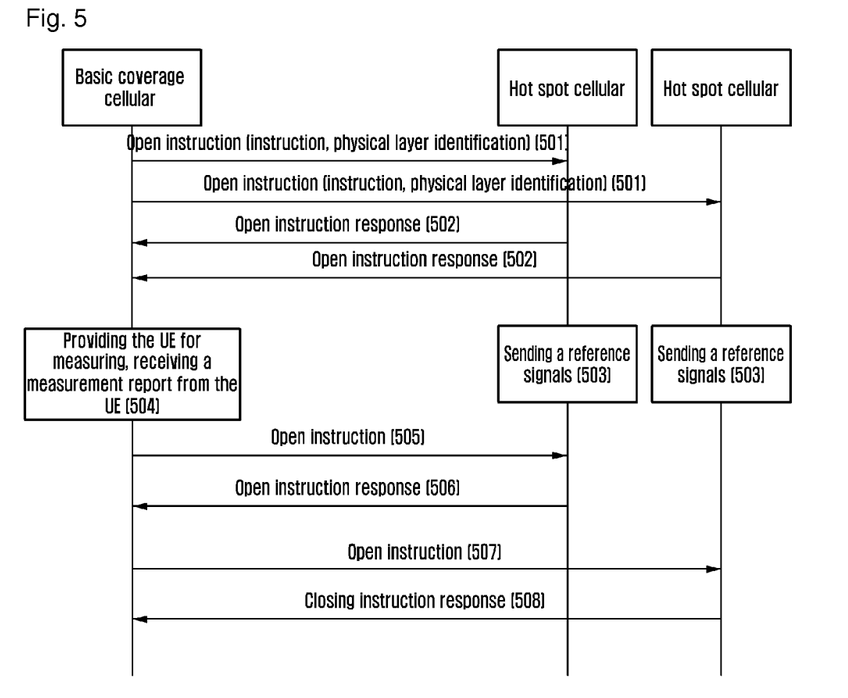
FIG. 5 is a flow diagram of switch on a base station in an application scene 1 according to the present invention.

An application scene 1 describes that the basic coverage cell selects the hot spot cell for switch on to share the users by the physical layer identity, when the user capacity to which the basic coverage cell serves is above the threshold. This application scene is a procedure as shown in FIG. 5. The method in FIG. 5 may include the following steps:

In step 501: the basic coverage cell decides to switch on some hot spot cells, and sends a switch on instruction to the hot spot cell. A message contains the instruction that allows the hot spot cell to entering the preparation state, and further may contain the physical layer identity used in the hot spot cell in the preparation state.

The message from step 501 is transmitted to multiple hot spot cells. The basic coverage cell configures different physical layer identity to the hot spot cells, and the different physical layer identities belong to the same type. The physical layer identity is divided into several types. The down-link reference signals corresponding to the physical layer identity with same type are transmitted in the same time frequency resources. The down-link reference signals corresponding to the different type of physical layer identity are transmitted in different time frequency resources. Therefore, in step 501, the physical layer identity used in the hot spot cell as configured by the basic coverage cell actually instructs the time frequency resource used for the reference signal. If the physical layer identity used in the all hot spot cells entering to the preparation state are belong to the same type, the down-link reference signals corresponding to these hot spot cells are transmitted in the same time frequency resources, so that the basic coverage cell can send the user data not using these time frequency resources as possible.

It should be pointed out that the basic coverage cell also may configure the time frequency used in the down-link reference signal, if the time reference resource corresponding to the current physical layer identity in the hot spot cell is as same as that configured by the basic coverage cellular, the hot spot cell will go into the preparation state. If they are different, the hot spot cell can select the physical layer identity corresponding to the time frequency resource, from a list of the physical layer identity supported thereby, use it in the preparation state. The list of the physical layer identity supported by the hot spot cell is pre-configured by the Operation and Management. Otherwise, the hot spot cell sends a message to the basic coverage cell, informing that the hot spot cell does not have the physical layer identity to meet the need, and thereby the hot spot cell does not go into the preparation state but still in the switch off mode.

In step 502: the hot spot cell sends a response message to the basic coverage cell, in which the message is optional.

The hot spot cell begin with the down link transmission and sends the down-link reference signals through an air interface.

In a preparation state, the hot spot cell use the configured physical layer identity by the basic coverage cell and sends the down-link reference signal in the time frequency corresponding to the configured physical layer identity.

In step 503: the basic coverage cell sends a measurement configuration message to the UE. The measurement configuration message may be as same as the message as defined in the present protocol. The basic coverage cell may send the measurement configuration to all or part of the UEs in a connecting mode.

In step 504: the UE sends measurement report message to the basic coverage cell. The measurement report message is as same as the message defined at present, including the measured physical layer identity, the measurement results of the reference signal in the cell, such as RSRP, RSRQ.

In step 505: the basic coverage cell sends answitch on instruction to the hot spot cellular. According to the measurement report from the UE, the basic coverage cell selects the cell that intends to entering a normal work state. If the user number who reported measurement result above the threshold is above the predetermined threshold, the basic coverage cell may select this hot spot cell to switch on, because this hot spot cell can effectively share the user capacity. Otherwise, the basic coverage cell may select to close the hot spot cellular, and then proceeding step 507.

In step 506: the hot spot cell sends a response message to the basic coverage cellular, in which the message is optional.

In step 507: the basic coverage cell sends a switch off instruction to the hot spot cellular.

The basic coverage cell sends a switch off instruction to the hot spot cell which does not need to be switch on to entering the normal state such that the hot spot cell keeps in the switch off mode.

Or in the step 501, a time limit is configured by the basic coverage cell, when the timer expired, if the hot spot cell does not receive 505 message transmitted by the basic coverage cell, it enters the switch off mode.

In step 508: the hot spot cell sends a response message to the basic coverage cell, in which the message is optional.

Figure 6:
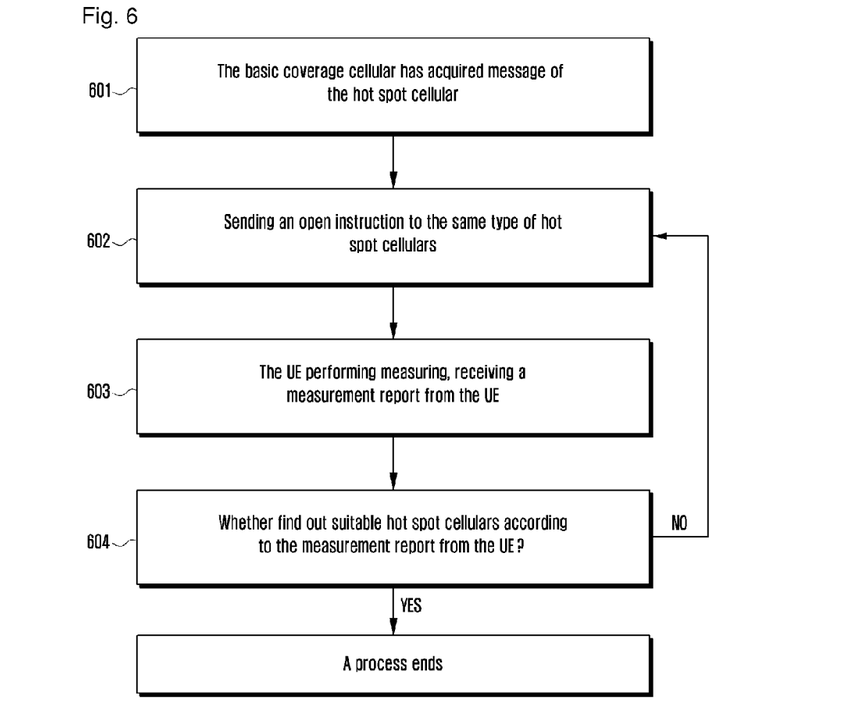
FIG. 6 is a flow diagram of switch on a base station in an application scene 2 according to the present invention.

An application scene 2 describes that the basic coverage cell switch on the hot spot cell in group by group. Action of the basic coverage cell will be described in this application scene, and the signaling procedure between the application scene and the hot spot cell is as same as illustrated in FIG. 2 of the background of the invention.

In step 601: the basic coverage cell has obtained the basic information of the hot spot cell already, such as the physical layer identity of the hot spot cells, and cell identity etc. These information can be obtained during neighboring relation establishment among the adjacent cells currently defined or by pre-configuration. For instance, if the basic coverage cell and the hot spot cell have a X2 interface, these information can be obtained by means of establishment of X2 or the afterward interaction on the X2 interface; without X2 interface, these information can be obtained by means of a S1 interface.

In step 602: the basic coverage cell store the physical layer identity of the cells. These physical layer identities are divided into different types, the down-link reference signals corresponding to the same type physical layer identification occupy the same time frequency resource. The basic coverage cell may firstly send a switch on instruction to the hot spot cell corresponding to the same type of physical layer identity, so as to allow such type of hot spot cell to enter the preparation state.

Receiving the switch on instruction which includes an instruction allowing the hot spot cell to access the preparation state, the hot spot cell accesses the preparation state, and sends the down-link reference signals in the time frequency resources corresponding to the physical layer identification.

In step 603: the basic coverage cell configures the UE for measuring, and receives a measurement report from the UE. The basic coverage cell may request all or part of the UEs in a connecting mode for measuring. In order to reduce the interference to the UE data as possible, the basic coverage cell may not allocate the UE in the time frequency resources used by the down-link reference signals in the hot spot cell currently in the preparation state, as the same time, can reduce probability that the UE occurs radio link failure, and facilitate improving the probability that the UE detects the hot spot cell.

In step 604: the basic coverage cell finds out suitable cell according to the measurement report from the UE, and instructions the hot spot cell to switch on, and thereby such procedure is finished. So-called suitable cell means that the cell can effectively share the user capacity of the basic coverage cell after being switch on, and contains a certain amount of the UEs in the coverage area thereof. The basic coverage cell may detects that the reference signals of UEs beyond the threshold amount to a predetermined value according to the report, in order to determine whether enough UEs are served by the cell. If the suitable hot spot cell can not be found out, step 602 will be in progress again that the basic coverage cell selects the hot spot cell with the other type of physical layer identifications, and basic coverage cell sends an switch on instruction such that the hot spot cell goes into the preparation state.

Figure 7:
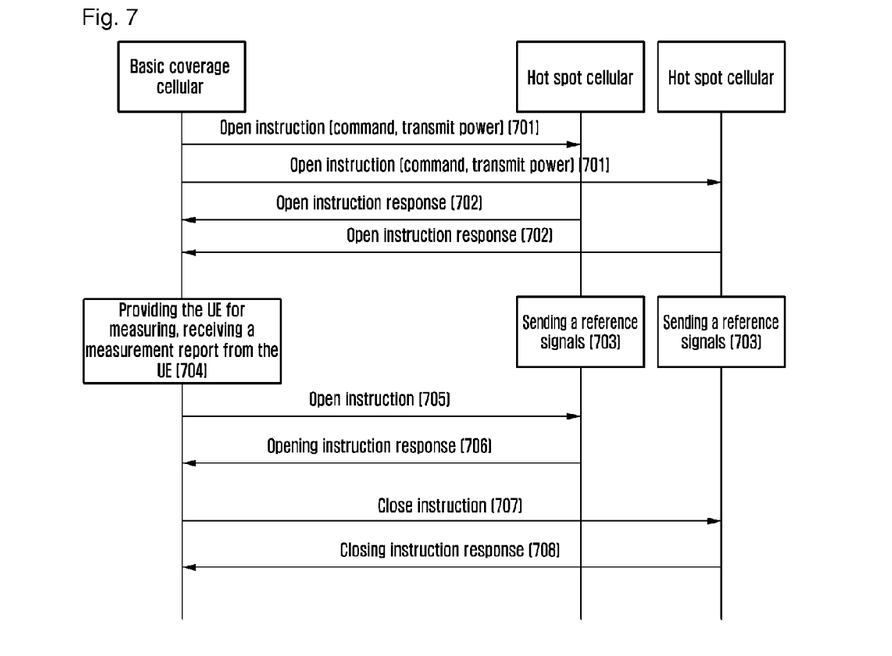
FIG. 7 is a flow diagram of switch on a base station in an application scene 3 according to the present invention.

An application scene 3 describes a method by which the basic coverage cell requests the hot spot cell to switch on and share some user capacity when the user capacity served by the basic coverage cell is above the threshold. This application scene is based on a procedure as illustrated in FIG. 7, that the method as shown in FIG. 7 may comprise the following steps:

In step 701: the basic coverage cell decides to switch on some hot spot cell, and sends an switch on instruction to the hot spot cell. A message includes an indication indicate the hot spot cell to go into the switch on preparation state, and further includes transmission power of the hot spot cell at the state of preparation, wherein the transmission power may define the maximum transmission power or a transmission power that should be used in the hot spot cell.

The message in step 701 is transmitted to multiple hot spot cells. The hot spot cell is configured with different maximum transmission powers by the basic coverage cellular. The hot spot cell located far from the transmit unit of the basic coverage cell may be configured with a smaller transmission power, and the hot spot cell located close to the transmit unit of the basic coverage cell may be configured with larger transmission power. Shown from this step, the application scene assumes that the basic coverage cell obtained the position of the hot spot cell previously. This position message may be reported to the basic coverage cell from the hot spot cell, or pre-configured in the basic coverage cell.

In step 702: the hot spot cell initiates a down-link transmission, and sends the down-link reference signal through an air interface. According to the configuration in step 701, the transmission power may be below or equal to a maximum transmission power configured to the hot spot cellular, or a transmission power configured in the hot spot cell.

In step 703: the basic coverage cell sends a measurement configuration message to the UE. The measurement configuration message may be the same as the message defined by the current protocol. The basic coverage cell may send measurement configuration to all or part of the UEs in a connecting mode.

In step 704: the UE sends a measurement report message to the basic coverage cell. The measurement report message is the same as the message defined by the current protocol, in which includes measured cell physical layer identity and measurement result of the reference signals of this cell, such as RSRP, RSRQ.

In step 705: the basic coverage cell sends a switch on instruction to the hot spot cell. The basic coverage cell selects the cell that is going to in the normal work state. According the measurement report of the UE, if the user number of reporting measurement result exceeding the threshold is above the predetermined threshold, the basic coverage cell may select this cell to switch on. Because this cell can effectively share the user capacity. Otherwise, the basic coverage cell may select to switch off the hot spot cellular, and the step 707 will be in progress.

The hot spot cell enters the normal work state after receiving the switch on instruction.

In step 706: the hot spot cell sends a response message to the basic coverage cellular, in which the message is optional.

In step 707: the basic coverage cell sends a switch off instruction to the hot spot cellular.

The basic coverage cell sends a switch off instruction to the hot spot cell which is required no need to switch on to the normal state such that the hot spot cell keeps in the switch off state.

Or in the step 701, a time is set in the basic coverage cell, thereafter, if the hot spot cell does not receive message 705 transmitted by the basic coverage cell, it goes into the switch off state.

In step 708: the hot spot cell sends a switch off response message to the basic coverage cell, in which the message is optional.

Figure 8:
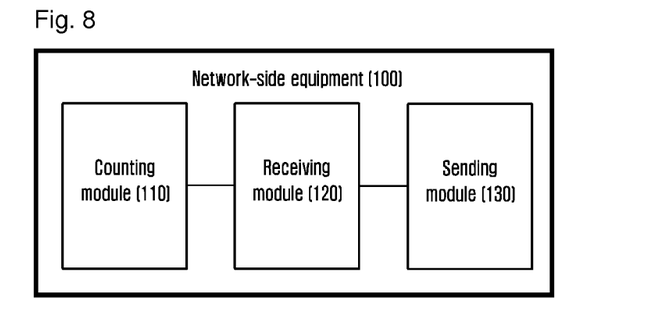
FIG. 8 is a structural diagram of a network-side equipment according to an embodiment of the present invention.

Corresponding to the above-mentioned method, as shown in FIG. 8, a network-side equipment 100 according to one embodiment of the present invention is provided, comprising but not limit to a base station, such as the network-side equipment reflected as a macro base station (eNodeB/NodeB).

The network-side equipment 100 includes a counting module 110, a receiving module 120 and a sending module 130.

Specifically, the counting module 110 is used for counting user capacity in a service area.

When the user capacity served by the cell is beyond a threshold, the network-side equipment 100 will select some applicable hot spot cell to switch on for sharing some users.

The receiving module 120 is used to provide a UE for measuring and receives a measurement result of the UE.

A measurement report transmitted by the UE includes a measurement result of the surrounding cells, such as the measurement report contains physical cell identity (PCI) measured by the UE, reference signal receiving power (RSRP) of the cell, and reference signal receiving quality (RSRQ). Each hot spot cell has only one PCI. If the RSRP or RSRQ of the hot spot cell corresponding to the PCI measured by the UE is above a certain threshold, it can be determined that the UE is covered by the hot spot cellular. If the UE covered by the hot spot cell is above a predetermined threshold, the sending module 130 can determine that the hot spot cell should be switch oned such that the hot spot cell can provide cell service to the UE. If the UE covered by the hot spot cell is below the predetermined threshold, the sending module 130 may determine that the hot spot cell should not be switch oned.

When the user capacity within the service area is above the predetermined threshold, the sending module 130 sends an switch on instruction in which carries the predetermined rule information to the hot spot cell in a switch off mode according to the predetermined rule; and when the user number within the hot spot cell complying with the predetermined rule amount to the predetermined number, the sending module 130 sends an switch on instruction to the hot spot cell such that the hot spot cell can provide communication service for the UE.

As illustrated in one embodiment of the above-mentioned equipment, the predetermined rule comprises one or more rules as follows:

the hot spot cell has the same type of physical layer identity;

a time frequency resource of the down-link reference signal of the hot spot cell is set as a predetermined value;

a physical layer identity of the hot spot cell is set as a predetermined value;

a transmission power or a maximum transmission power of the hot spot cell is set as a predetermined value.

As illustrated in the embodiment concerning the above equipment, the hot spot cell having the same type physical layer identity sends the down-link reference signals in the same time frequency resource.

As illustrated in the embodiment concerning the above equipment, in the case that the hot spot cell is configured with a predetermined rule that the transmission power or the maximum transmission power is equal to a predetermined value, the hot spot cell sends the down-link reference signals in such a manner that the transmission power is a predetermined value or the maximum transmission power is below or equal to the predetermined value.

As illustrated in the embodiment concerning the above equipment, the transmission power or the maximum transmission power can be determined depending on a position information between the network-side equipment 100 and the hot spot cellular.

As illustrated in the embodiment concerning the above equipment, after the sending module 130 sends a switch on instruction to the hot spot cell in the switch off state and in conformity with the predetermined rule, the hot spot cell goes into the switch on preparation state, and sends the down-link reference signals through the air interface.

As illustrated in the embodiment concerning the above equipment, when the users within the hot spot cell in the switch on preparation state do not amount to the predetermined number, the sending module 130 sends a close instruction to the hot spot cell such that the hot spot cell turns to the closed state.

According to the above-mentioned technical solutions, the present invention can make the data receiving of the UE suffer from a slight interference, and make the data receiving of the UE reduce the interference from the down-link reference signals of the hot spot cell as possible, by setting rules to select the hot spot cell adapted to be initiated; and also can effectively reduce probability that the UE occurs failure in the radio link, by selecting the hot spot adapted to be initiated; and additionally facilitate improving the probability that the UE detects the hot spot cellular. The above-mentioned technical solutions of the present invention make a slight alternation to the present system, and thereby can not affect compatibility of the system and achieve simplicity and high efficiency.

It can be understand by those skilled in the art that all or part of the steps of the foregoing embodiments may be implemented by hardware instructed by a computer program. The program may be stored in a computer-readable storage medium. When being executed, the program performs all or part of the steps in foregoing method embodiments.

In addition, all functional units in the embodiments of the present invention may be integrated into a processing module, or exist independently, or two or more of such units are integrated into a module. The integrated module may be hardware or a software module. When being implemented as a software module and sold or applied as an independent product, the integrated module may also be stored in a computer-readable storage medium.

The storage medium may be a Read-Only Memory (ROM), magnetic disk or Compact Disk (CD).

The invention is described through some exemplary embodiments. It is apparent that those skilled in the art can make modifications and variations to the invention without departing from the scope of the invention. The invention is intended to cover the modifications and variations provided that they fall in the scope of protection defined by the following claims or their equivalents.

The invention claimed is:

1. A method of switching on a second base station, the method comprising:

transmitting, by a first base station, a first switch-on message including time information associated with a switch-on state and a physical layer identity corresponding to a down-link reference signal of the second base station, to the second base station in a switch-off state;

receiving, at the first base station, a measurement report generated based on a time frequency resource of the down-link reference signal, from a user equipment (UE); and transmitting, if the measurement report fulfills a predetermined condition, by the first base station, a second switch-on message to the second base station for providing a communication service to the UE based on the time information.

2. The method of claim 1, wherein second base stations, having a same type of physical layer identity, transmit down-link reference signals in the same time frequency resource.

3. The method of claim 1, wherein the first switch-on message further comprises a maximum transmission power of the down-link reference signal.

4. The method of claim 3, wherein the maximum transmission power is determined according to position information between the first base station and the second base station.

5. The method of claim 1, wherein, after receiving the first switch-on message, the second base station in the switch-off state changes into a switch-on preparation state, and transmits the down-link reference signals through an air interface.

6. The method of claim 1, further comprising:
transmitting a switch-off message to the second base station to change the second base station to the switch-off state.

7. A first base station comprising:
a communication device configured to transmit and receive signals; and
a controller configured to:
transmit a first switch-on message including time information associated with a switch-on state and a physical layer identity corresponding to a down-link reference signal of a second base station in a switch-off state to receive a measurement report generated based on a time frequency resource of the down-link reference signal from a user equipment (UE) sending module for sending a switch on instruction in which carries the predetermined rule information to a hot spot cell in a closed state according to a predetermined rule, and
transmit, if the measurement report fulfills a predetermined condition, a second switch-on message to the second base station for providing a communication service to the UE based on the time information.

8. The first base station of claim 7, wherein second base stations, having a same type of physical layer identity, transmit down-link reference signals in the same time frequency resource.

9. The first base station of claim 7, wherein the first switch-on message further comprises a maximum transmission power of the down-link reference signal.

10. The first base station of claim 9, wherein the maximum transmission power is determined according to position information between the first base station and the second base station.

11. The first base station of claim 7, wherein, after receiving the first switch-on message, the second base station in the switch-off state changes into a switch-on preparation state, and transmits the down-link reference signals through an air interface.

12. The first base station of claim 7, wherein the controller is further configured to transmit a switch-off message to the second base station to change the second base station to the switch-off state.

* * * * *